May 5, 1959     G. F. BURGER     2,885,227
PRESSURE-TIGHT SEAL
Filed May 24, 1954     2 Sheets-Sheet 2
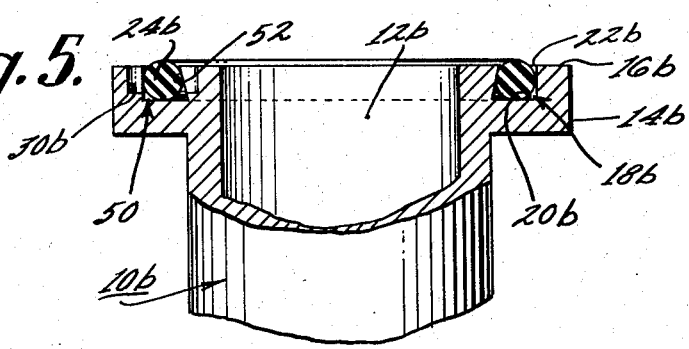
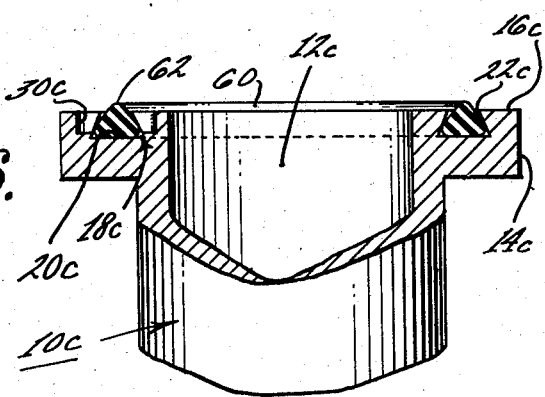
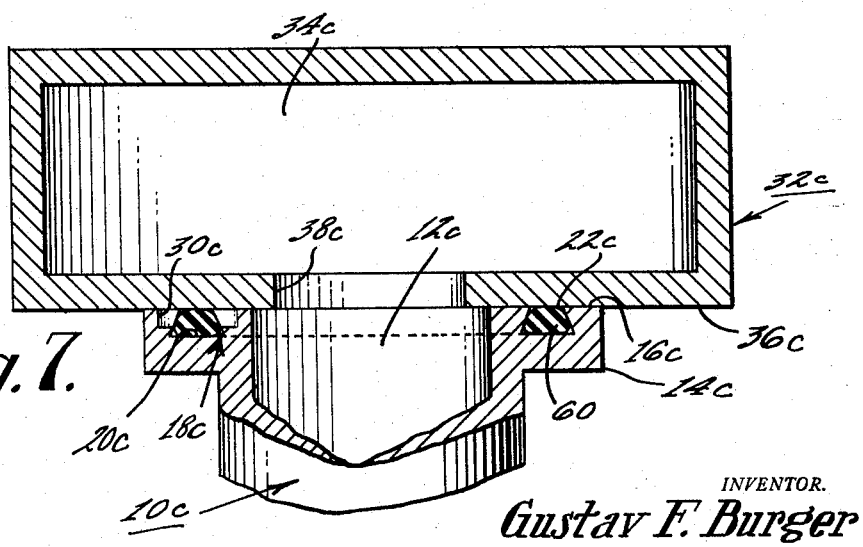
INVENTOR.
Gustav F. Burger
BY
ATTORNEY

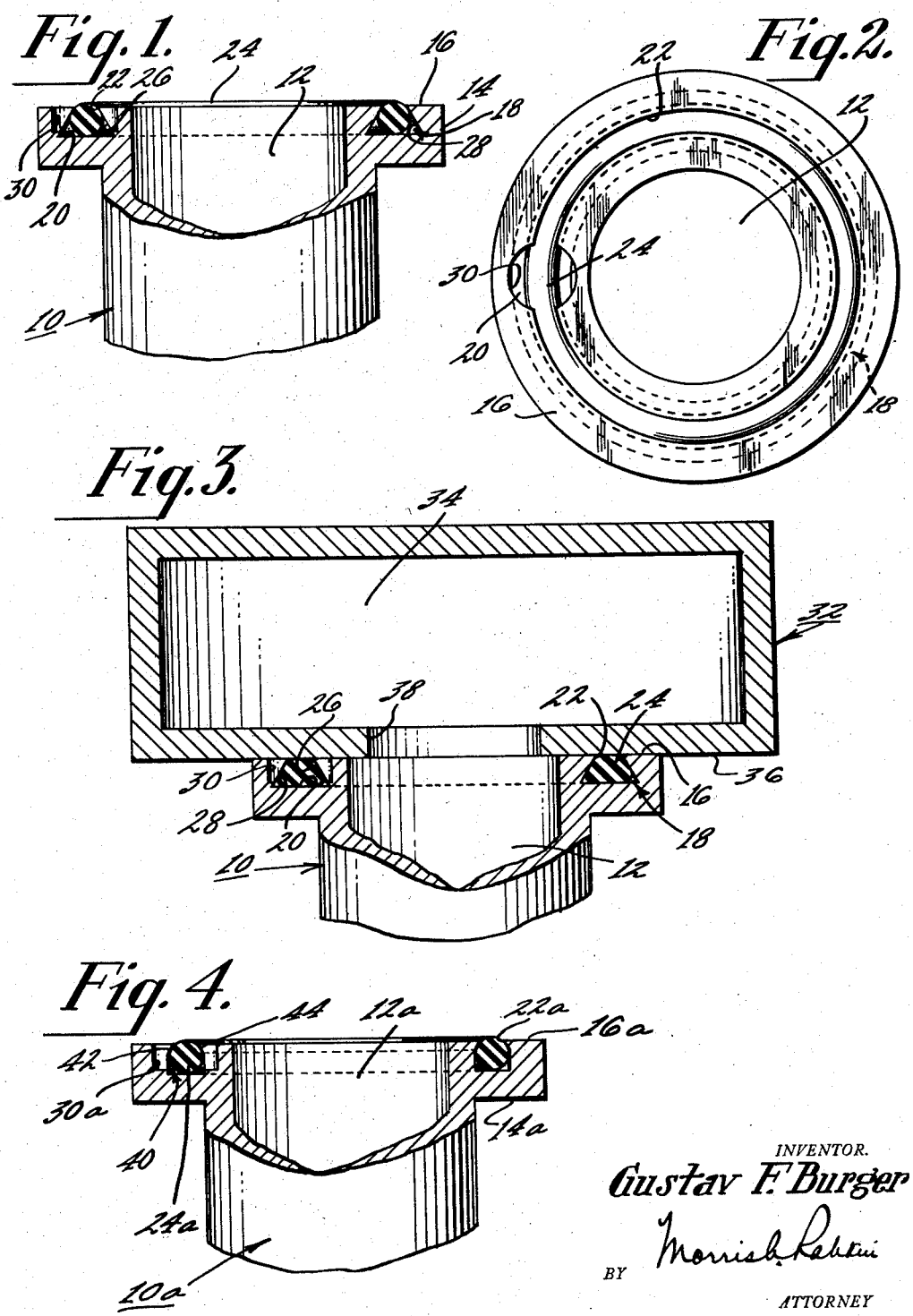

United States Patent Office 2,885,227
Patented May 5, 1959

2,885,227

PRESSURE-TIGHT SEAL

Gustav F. Burger, Camden, N.J., assignor to Radio Corporation of America, a corporation of Delaware Application May 24, 1954, Serial No. 431,726

5 Claims. (Cl. 286—1)

This invention relates to pressure-tight seals between two relatively sliding surfaces, and, more particularly, to a novel vacuum-tight seal between two flat relatively sliding surfaces.

Various problems are encountered in providing a reliable seal, for example, of the O-ring type between two flat relatively sliding surfaces or flanges. These problems are accentuated where the movement of the surfaces is great enough to uncover the seal and its groove at certain times during the cycle of operation. The lateral force on the gasket material caused by the relative movement of the surfaces being sealed may distort the gasket. This may cause the gasket to bunch up at a point and break the seal. The gasket may be rubbed loose from its seat by this relative movement. Retention of a gasket in its seat when the sliding surfaces are out of contact with one another also presents a problem.

The working chamber of an electron microscope must be held at a low pressure or high vacuum to prevent molecular interference with the electron beam. Certain compartments adjoining the working chamber must be adapted for relative movement with respect to the working chamber without affecting the low pressure or vacuum within the working chamber. The chamber, for example, containing the electron-emissive cathode or containing an electron lens, must be capable of convenient relative movement with respect to the working chamber. This is necessary to align the axis of the electron beam with respect to the target. A slide valve may be used to control the fore-pumping and fine-pumping pressure reducing operations.

Since the surfaces being sealed must be freely moved relative to one another, it has been found necessary to rely upon the weight of the apparatus, atmospheric pressure or spring pressure to maintain the sliding surfaces in contact with one another. Maintaining a vacuum-tight seal under these conditions is especially difficult. This invention teaches how a novel seal between two flat relatively sliding surfaces may be provided which operates reliably even under these especially exacting conditions.

An object of this invention is to provide a novel pressure-tight seal between two flat relatively sliding surfaces.

Another object is to provide a seal of the aforementioned type which is particularly well adapted for vacuum-tight seals between two flat freely moving relatively sliding surfaces.

According to this invention an undercut groove is formed in one of the flat sliding surfaces making up the joint. The groove has a narrow entrance and widens out within its interior. A gasket of resiliently deformable material, for example rubber, is provided. It has an undeformed cross-sectional dimension in width larger than the entrance to the groove. This gasket is deformed to a dimension smaller than the entrance and is forceably inserted within the groove. The gasket, after passing the entrance to the groove, expands to a cross-sectional dimension in width which is too large to pass back through the narrow entrance. The walls of the groove and the gasket are formed to allow a portion of the gasket to protrude above the surface through the entrance to the groove, when the cooperating sliding surfaces are separated. When the sealing surfaces are slid into contact the gasket is forced still further within the groove. The groove is made large enough in area to receive all of the deformed gasket without forcing the surfaces apart. The protruding portion of the gasket is formed to have a dimension which always remains smaller than the distance across the entrance to the groove. This permits all of the gasket material to be forced within the groove when the gasket is compressed between the sliding surfaces. A convenient seal or joint of this type, for example, may be provided by a rubber O-ring retained within a dovetail-shaped groove.

Other objects and advantages of the present invention will become apparent to one skilled in the art from a reading of the following specification in conjunction with the accompanying drawings of illustrative examples constructed according to the teachings of the present invention in which:

Fig. 1 is a view in elevation, partially in cross section, of a flanged member having a seal installed therein which shows an illustrative embodiment of the present invention;

Fig. 2 is a plan view of the flange shown in Fig. 1;

Fig. 3 is a view in elevation, partially in cross section, showing the flange shown in Fig. 1 together with a cooperating flanged member making up an illustrative pressure-tight joint;

Fig. 4 is a view in elevation, partially in cross section, of another flanged member having a seal installed therein which is also illustrative of the present invention;

Fig. 5 is a view in elevation, partially in cross section of another flanged member having a seal installed therein, which shows another illustrative embodiment of the present invention;

Fig. 6 is a view in elevation, partially in cross section, of another flanged member having a seal installed therein, which shows another illustrative embodiment of the present invention; and Fig. 7 is a view in elevation, partially in cross section, of the flanged member shown in Fig. 6 together with a cooperating flanged member making up an illustrative pressure-tight joint.

In Figs. 1 and 2 is shown a conduit or casing 10 enclosing a chamber 12. A flange 14 is provided at one end of the casing. The face 16 of the flange is machined to a smooth finish to provide a smooth surface for sealing contact with another flat surface (not shown). An undercut groove 18 is formed in the flange 14. The groove is undercut so that in cross section it forms a dovetail-shaped cavity. The groove is, therefore, wider at its base 20 than it is across its entrance 22 in the face 16 of the flange.

A gasket 24 made of a resiliently deformable material, for example rubber, is shown inserted within the groove. The groove is formed in a closed continuous curve and may be described, therefore, as ring-like or annularly shaped. The ring-shaped gasket may be round in cross section. There are standard seals made in a toroid form of resilient materials, such as synthetic or natural rubber, which may also be used. They are called O-rings. The sealing ring will be hereafter referred to as a seal or gasket.

There is a critical relationship between the dimensions of the gasket and that of the sealing ring for proper operation of the seal. The radial distance across the entrance 22 to the groove measured at the surface 16 must be less than the largest cross-sectional dimension of the seal. The largest cross-sectional dimension of the O-ring is its diameter. This will cause the sealing ring to be positively sealed within the groove when the surfaces of the joints are separated. Since the gasket is made of a resilient material, it can be forced past the narrow entrance of the groove into the wider cross section provided by the base of the groove. The slanted walls 26 and 28 of the groove therefore resiliently and positively retain the gasket within the groove. The depth of the groove below the surface is less than the height of the gasket, which for the illustrated O-ring, is its diameter. A small portion of the O-ring therefore projects above the surface of the flange.

An access hole 30 is bored at right angles to the face 16 through a portion of the groove. The hole is drilled to a sufficient depth to allow the ring to be grasped by a hook inserted through this hole. The bored hole 30 extends laterally beyond the limits of the groove but is not drilled to the full depth of the groove. The hole provides a means for inserting a tool such as a hook to pull the seal from the groove. This permits replacement of damaged rings and provides for the gas to escape from the voids formed between the lower corners of the groove and the sealing gasket. This trapped gas may sometimes escape from these voids through scratches in the side walls of the grooves to cause what is known as a virtual leak in the vacuum system. The hole 30 may be of any convenient shape.

In Fig. 3, the chamber or conduit 10 shown in Figs. 1 and 2 is shown assembled with a cooperating casing 32 forming an adjoining chamber 34. Parts shown in Fig. 3, which are the same as those shown in Figs. 1 and 2, have the same reference characters. The base 36 of the casing 32 is machined to a smooth finish to provide a close metal to metal contact with the face 16 of the flange 14. An aperture 38 which may be circular in form is provided in the base of the casing 32. This aperture provides a means of connection between the chamber 34 in casing 32 and the chamber 12 within casing 10. The casing 32 may represent the portion of an electron microscope containing the electron-emissive cathode (not shown) or an electron lens (not shown). The casing 32 must be, therefore, laterally adjustable with respect to the casing 10 which may represent the chamber of the electron microscope which contains the target. This provides means for aligning the axis of the electron beam with respect to the target. The cooperating casings 32 and 10 may also represent separate portions of a slide valve used in an electron microscope to control the fore-pumping and fine-pumping operations which reduce the pressure within the working chamber to the required low pressure or vacuum conditions.

In these illustrative embodiments, there are shown no means to actually hold the sliding surfaces of the cooperating chambers together other than the weight of the upper chamber and the atmospheric pressure acting on the external portions of the chambers, when a vacuum or subatmospheric pressure is pumped within the chambers. Some means to provide an axial force to hold the surfaces forming the joint together such as a spring loading device may be provided. When such axial force is provided this type of joint may be used to seal against a positive or higher than atmospheric pressure. The magnitude of the pressure to which the joint maintains its seal depends upon the magnitude of the axial force applied to maintain the surfaces of the joint in contact with one another.

Fig. 3 illustrates how the gasket cooperates with the sealing surfaces to form a pressure-tight joint. When the surface of the base 36 contacts the protruding portion of the gasket, it forces it within the groove. The groove has a cross-sectional area sufficiently large to accommodate the entire deformed gasket. The groove must be large enough to accommodate all of the gasket without applying an excessive pressure to the cooperating sealing surface 36. An illustrative example of a joint which has been found to work in a satisfactory manner as shown in Figs. 1, 2 and 3 is provided by a dovetail-shaped groove having a base dimension measured radially of 0.250 inch and having a radial distance across the groove entrance of 0.125 inch. The depth of the groove is 0.112 inch. A rubber O-ring having diameter of 0.140 inch has been found to provide a satisfactory vacuum seal in cooperation with this groove.

When the surfaces are separated by sliding so that the groove containing the O-ring is uncovered, as in slide valve operation, the gasket is positively retained within the groove. As the sealing surface is once more moved across the groove, the O-ring is forced within the groove without wedging or binding at the surface. The gasket is positively held within the groove so that it cannot be extruded from the groove during the sliding operation. When a difference in fluid pressure exists across the seal it is distorted to seal the join between the surfaces on the low-pressure side in the normal O-ring manner.

In Fig. 4 is shown another embodiment of the present invention. In the embodiment shown in Fig. 4, the parts which are the same as those shown in Figs. 1, 2 and 3 are identified by the same reference characters used in Figs. 1 to 3, followed by the subscript "a." In Fig. 4, the groove is formed in a slightly different manner than shown previously. The flange 14a has a groove 40 which is similar to the groove 18 shown in flange 14 of Fig. 1. The groove 40 however is substantially rectangular in shape. An undercut effect, however, is provided by the inward sloping projections 42 and 44 adjacent the entrance 22a to the groove. These inward sloping projections provide a means for resiliently retaining the rubber O-ring 24a within the groove. The height and depth of the groove and its base and entrance measurements may be made functionally similar to the groove 18 shown in Fig. 1. The ring as shown may have dimensions similar to the ring shown in Fig. 1. This seal operates in the same manner as the seal shown in Fig. 3. The positively retained ring is compressed within the groove by the sliding action of a cooperating sealing surface (not shown).

In Fig. 5 is shown still another illustrative embodiment of another seal constructed according to the teachings of this invention. Parts shown in Fig. 5 identical to those shown in Fig. 1 have the same reference characters followed by the subscript "b." The groove 50 in flange 14b is substantially similar to the groove 18 shown in Fig. 1. The groove 50, however, has only one of its walls slanted inward. This inward slanted wall, for example, may be the radially inner wall 52 of the annular groove. An O-ring 24b is resiliently retained within the groove. The slanted wall provides a groove entrance 22b similar to 22 which is smaller than the diameter of the sealing ring. The base 20b of the groove is large enough to provide a cross-sectional area for the groove sufficient to receive the entire O-ring when compressed by a cooperating sealing sliding surface (not shown). The ring and groove may be positioned in the manner described to provide the retaining and sealing functions described in conjunction with the aforementioned illustrative embodiments of this invention.

In Figs. 6 and 7 is shown an illustrative embodiment of the present invention which uses a seal which is not circular in cross section. Parts shown in Figs. 6 and 7 which are identical to parts shown in 1, 2 and 3 have the same reference characters followed by the subscript "c." In Fig. 6, the seal 60 is shown within the groove 18c. The seal 60 may be of material which is resiliently deformable, such as rubber (same as Fig. 1), but may be of roughly triangular cross section rather than circular. The ring is forceably inserted past the entrance 22c to the groove. It is retained within the groove with its base lying adjacent the base 20c of the groove while the apex 62 of the seal projects through the entrance to the groove. The ring and groove are of proper cooperating dimensions to resiliently and positively hold the seal within the groove. The protruding apex provides the sealing means when compressed by a cooperating sliding surface.

In Fig. 7 are shown the casings 10c and 32c having surfaces 16c and 36c in metal to metal contact with each other. The surface 36c forces the ring 60 entirely within the groove 18c. The tip or apex 62 of the ring is of a cross section which when flattened or compressed by the sliding surface 36c is smaller than the entrance 22c to the groove. This allows the ring to completely enter the groove without pinching, binding or wedging at the entrance. A hole 30c is provided for removing the gasket 60 from the groove 18c.

According to the teachings of this invention grooves of various shapes with cooperative seals may be provided to construct seals between resiliently sliding surfaces. As illustrated, the grooves and their rings must be shaped in accordance with the teachings of this invention to inherently provide the retaining and sealing functions for this sliding type of service. For the purposes of illustration, the grooves and seals have been shown as closed continuous curves. This seal, however, is also adapted for use in straight line or open curve applications. The critical cross-sectional relationship between the groove and the sealing material will provide adequate sealing characteristics whether the groove is a continuous curve closing upon itself such as a circle, or an ellipse, or an open curve such as a straight line.

What is claimed is:

1. A structure providing a pressure-tight seal between flat relatively sliding surfaces of members abutting each other and movable with respect to each other comprising means providing an undercut groove of continuous closed form in one of said members extending from said flat surface thereof, an O-ring made of resiliently deformable material disposed within said groove, the distance across the entrance to said groove being substantially smaller than the cross-sectional diameter of said O-ring to positively retain said O-ring within said groove, the depth of said groove being less than the cross-sectional diameter of the O-ring to cause a portion of said O-ring to protrude through the entrance to said groove to provide a pressure-tight seal when it is deformed by contact with the other of said surfaces, and the cross section of said groove being large enough to receive all of said O-ring when it is compressed between said flat surfaces.

2. The invention as set forth in claim 1 wherein said undercut groove forms a substantially dovetail-shaped cavity.

3. A structure providing a vacuum-tight seal between relatively sliding flat annular surfaces of two members abutting each other and movable with respect to each other comprising means providing an undercut groove annularly disposed in one of said members extending from said flat surface thereof, a resiliently deformable O-ring disposed within said groove, the distance across the entrance to said groove being substantially smaller than the cross-sectional diameter of said deformable O-ring to cause said O-ring to be positively retained within said groove, the depth of said groove being less than the cross-sectional diameter of said O-ring to cause a portion of said O-ring to protrude through the entrance to said groove to provide a pressure-tight seal when compressed between said flat surfaces, and the cross-sectional area of said groove being large enough to receive all of said O-ring when it is compressed between said flat surfaces.

4. A structure for providing a pressure-tight seal between flat relatively sliding surfaces of members movable with respect to each other comprising means providing a closed continuous undercut groove in one of said flat sliding members extending from said flat surface thereof, a resiliently deformable gasket disposed within said groove, the cross-sectional area of said groove being greater than the cross-sectional area of said gasket, the width of said undercut groove being at its entrance narrower than the widest cross-sectional dimension of said gasket to resiliently retain said gasket within said groove when said flat surfaces are separated, the depth of said groove being less than the height of said gasket when said gasket is disposed therein whereby a portion protrudes above said flat surface through said entrance to said groove when said flat surfaces are separated, said protruding portion of said gasket having a width smaller than the distance across said entrance to said groove when said gasket is forced within said groove by the other of said flat sliding surfaces, said grooved member having a hole therein communicating with said groove, the depth of said hole being less than the depth of said groove whereby to provide an entrance into said groove for the insertion of a hook to grasp said gasket for removal.

5. In an electron microscope having at least two evacuable chambers, each of said chambers having walls abutting each other, each of said abutting walls being slidable with respect to each other and having apertures therein communicating said chambers with each other, a structure providing a pressure-tight seal in said abutting walls to prevent the introduction of gases into said chambers comprising in combination, a ring gasket of deformable, resilient material, having a round cross-sectional configuration, one of said abutting walls having an annular groove therein for receiving said gasket provided with a cross-sectional configuration to counteract lateral, sliding frictional forces tending to damage said gasket and extract it from said groove, the base of said groove being wider than the entrance thereof in cross-section, said entrance and depth of said groove being smaller than the cross-sectional diameter of said gasket whereby a portion of said gasket tends to protrude through said groove entrance, and said cross-sectional area of said groove being greater than said cross-sectional area of said gasket whereby said gasket is confinable entirely within said groove.

References Cited in the file of this patent

UNITED STATES PATENTS

| | | |
|---|---|---|
| 1,208,454 | Baumeyer | Dec. 12, 1916 |
| 1,242,742 | Townsend | Oct. 9, 1917 |
| 1,327,965 | Rotter | Jan. 13, 1920 |
| 2,330,220 | Kemper | Sept. 28, 1943 |
| 2,417,494 | Hoff | Mar. 18, 1947 |
| 2,462,493 | Hamer | Feb. 22, 1949 |
| 2,510,417 | Rehklau | June 6, 1950 |
| 2,606,344 | Clark | Aug. 12, 1952 |
| 2,621,885 | Schmitt | Dec. 16, 1952 |
| 2,649,313 | Burger et al. | Aug. 18, 1953 |
| 2,704,650 | Rand | Mar. 22, 1955 |